Dec. 6, 1932.  G. A. MONTGOMERY  1,889,872
INSERTED JOINT ROTARY DRILL STEM
Filed Aug. 25, 1931  2 Sheets-Sheet 1
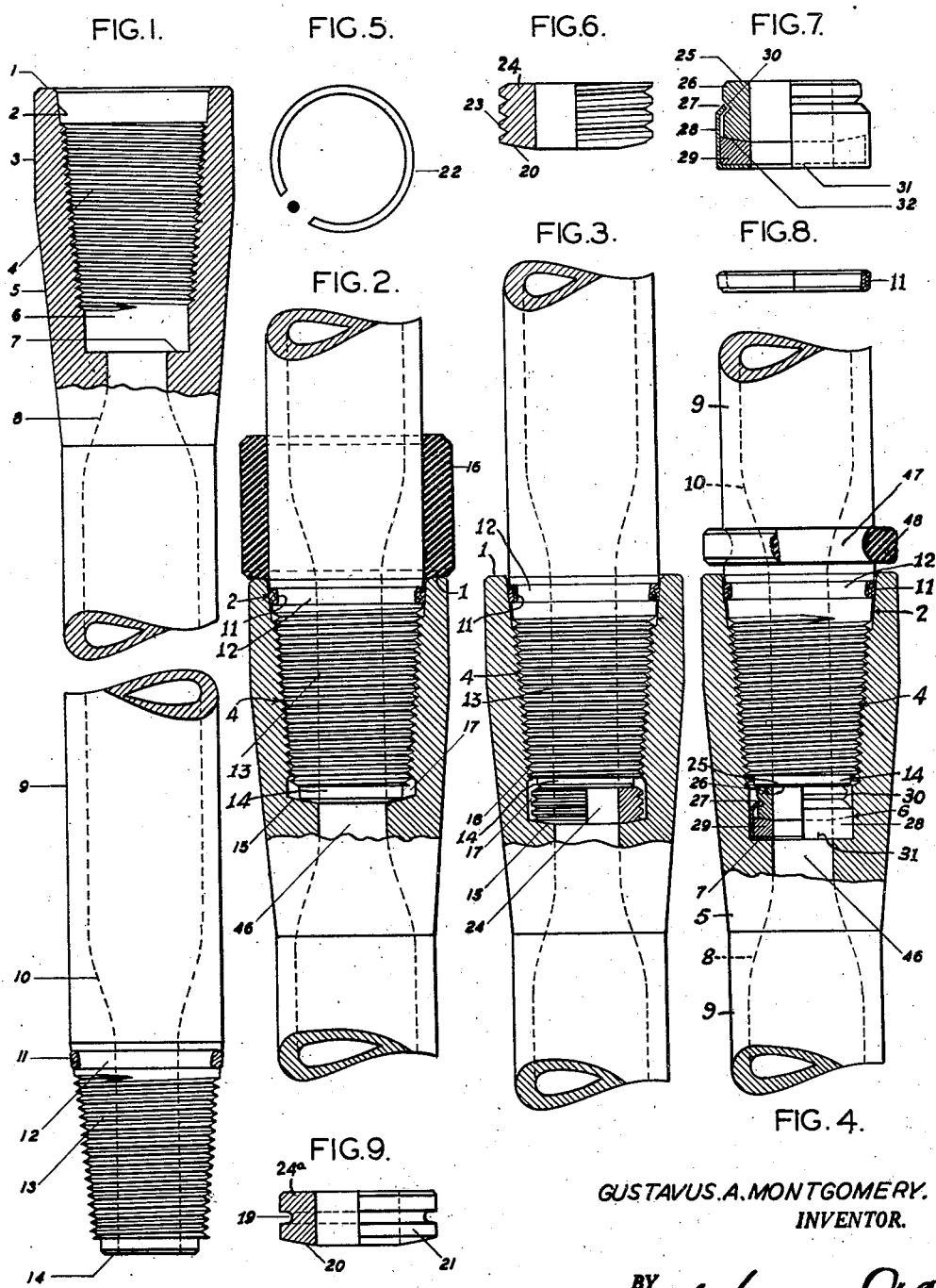
GUSTAVUS. A. MONTGOMERY.
INVENTOR.

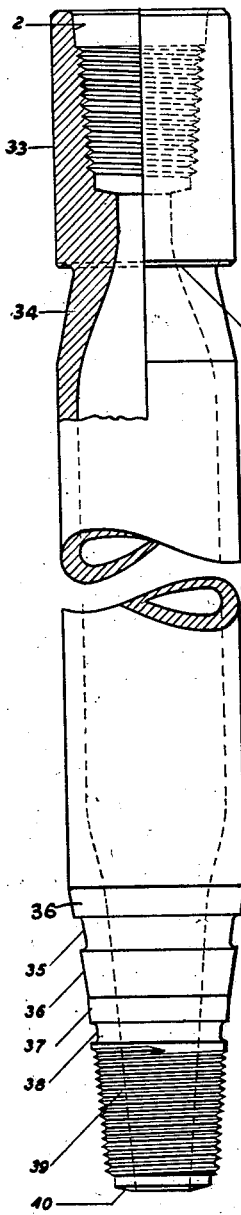
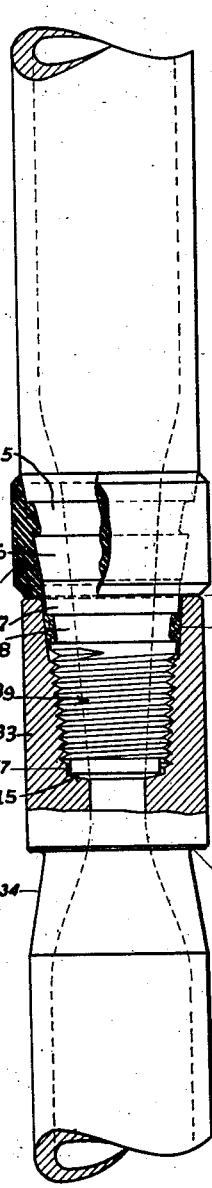
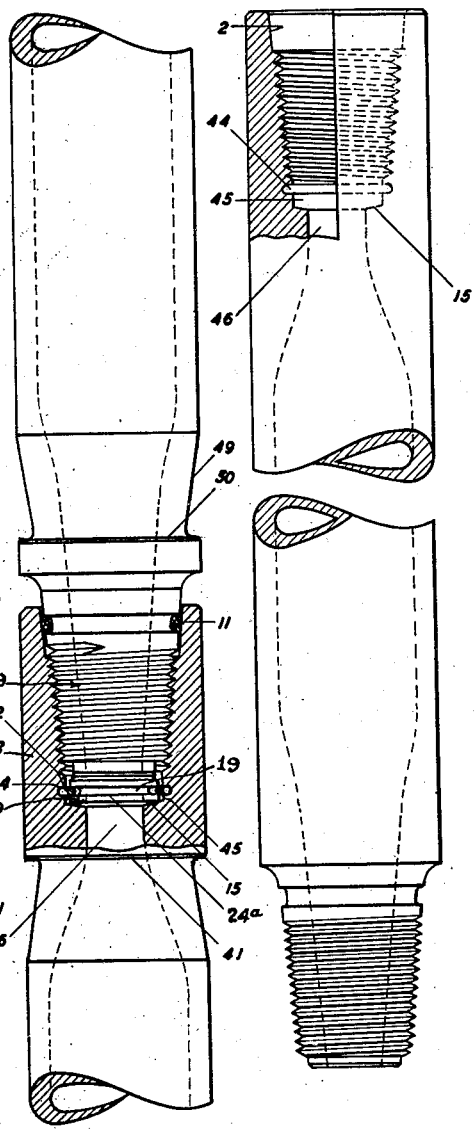
GUSTAVUS. A. MONTGOMERY.
INVENTOR.
BY Munn & Co
ATTORNEYS.

Patented Dec. 6, 1932

1,889,872

UNITED STATES PATENT OFFICE

GUSTAVUS A. MONTGOMERY, OF DALLAS, TEXAS

INSERTED JOINT ROTARY DRILL STEM

Application filed August 25, 1931. Serial No. 559,236.

This improvement relates to hollow shafting, which conveys great torque and high pressure hydraulic flow. Its chief uses are in connection with deep earth boring for oil, gas, water, or minerals. Due to the manner in which the tubes are joined, one to another, the article is called an inserted joint rotary drill stem, as already indicated.

The object of my invention is to provide a new type rotary drill stem, which possesses greater strength and durability in the threaded connections, combined with the lightest total weight of assembled stem in comparison with any hitherto used drill stem of equivalent specifications.

To provide a durable, acutely tapered coarsely threaded connection to join one tube unit to another, wherein the requisite stop shoulders, to limit entry of the pin member into the box member are within the tubes, avoiding exterior shoulders.

To provide a durable, acutely tapered, coarsely threaded connection having a self-aligning interior stop shoulder which prevents localized over-loads on the threaded parts due to swaying of the pin joint within the box joint.

To provide an acutely tapered coarsely threaded connection having a self-adjusting liquid-tight seal on end of the tube pin and bottom of the tube box to form a liquid-tight seal ahead of the threads.

A further object is to provide a drill stem having near its box end an outwardly expanding taper or inwardly receding recess to serve as a conically tapered seat for elevators or slips.

To provide on the pin end of the tube a conical recess encompassed within the outer periphery of the tube, to serve as an elevator or slip shoulder in case it is necessary to make threaded connections to the drill stem demanding pointing of the pin upwards.

To provide on the pin end of the tube an exterior, inwardly receding conical section having a circular recess, said conical section and recess serving as seat and retainer for a resilient guide ring.

To provide means on the pin end which cooperatively with box counterbore retains lubricant in threaded connections.

To provide a drill stem wherein the interior upsets on the tube require a minimum gather of metal and weight, thus forming a smooth fluid passage free from abrupt shoulders.

To eliminate all supplementary connecting collars and make direct threaded connections from one tube unit to another.

To provide a threaded connection wherein the more exacting stresses of elongation are on the structurally stronger box member, and the pin member, which is of lesser structural strength, is subjected to a stress of a less rigorous nature, which is compression.

A further object is to avoid any exteriorly expanded shoulder on the pin end, but to employ an elastic flange to space vertically stacked drill stem stands on the derrick floor to protect the threads, or while the tubes are in transit, or stacked horizontally.

To provide a conical seat on the pin end of each tube adapted to permanently retain a resilient tube guide in the nature of a resilient ring.

The accompanying drawings illustrate the embodiments of the invention, wherein:—

Figure 1 is a partially sectional and elevational view of a tube unit, particularly showing the tapered exteriorly expanded elevator or grappling tool seat on the box end.

Figure 2 is a partially sectional and elevational view showing the joining together of two tube units, the confronting box and pin end having spherical end thrust surfaces making a liquid-tight joint ahead of threads.

Figure 3 is a view similar to Figure 2 showing the joining together of two tube units, wherein the tube box has a spherical seat and the confronting pin end has an annular flat seat, an interposed spacer ring controlling the entry of pin end into the box end, simultaneously forming a self-aligning liquid-tight seal.

Figure 4 is a view similar to Figure 2 showing the joining together of two tube units, wherein the box bottom and pin end have flat surfaces, and the annular spacer ring between the pin end and box bottom is a self-contained and self-adjusting end thrust ring and liquid seal unit.

Figure 5 is a detail view of a snap ring, which retains a certain thrust ring, later described, in place.

Figure 6 is a partially sectional and elevational view of the spacer ring, in Figure 3.

Figure 7 is a partially sectional and elevational view of the spacer ring, shown in Figure 4.

Figure 8 is a partially elevational and sectional view of a resilient lubricant retaining ring or packing.

Figure 9 is a partially sectional and elevational view of a modified type of spacer ring.

Figure 10 is a view similar to Figure 1 showing another type of tube unit, having an inwardly converging conical recess adjacent to the box end to form an elevator or grappling tool shoulder, and having on the pin end a secondary conical structure to receive a resilient guide ring.

Figure 11 is a view similar to Figure 2 showing the joining together of two tube units such as shown in Figure 10.

Figure 12 is a view similar to Figure 2 showing the joining together of two tube units having exterior recesses at the pin and box ends.

Figure 13 is a view similar to Figure 10 showing a simpler form of tube, devoid of elevator shoulders or cones.

Figure 14 is a partially elevational and sectional view of a modified type of collar for use on tube pins, having no exterior stop shoulders and whose pin diameter is not substantially reduced below the tube diameter.

In very deep wells the actual weight of the rotary drill stem suspended in the well bore may become so great that the uppermost tubes and their threaded connections are stressed so heavily longitudinally that the residue of strength for performing useful work, consisting of rotating the boring tool and conducting the mud laden fluid to the boring tool, and the margin of safety are very small. This longitudinal stress will be still further accentuated on the threaded pin member, if the joint happens to have stop shoulders externally of the pin end and box. In fact, it is possible, and in practice it has often happened, that by excessively tightening the threaded connection the pin has been sheared. While drilling, the longitudinal stress on the pin threads increases in direct proportion to the torque if the pin joint has an external stop shoulder as mentioned above.

By placing the seat on the pin end as at 14 or 40, (Figs. 1 and 10) the stress on the pin member is composed solely of compression, and therefore the torque does not cause elongation of the pin threads.

In threaded connections in rotary drill stems, the male or pin members 13 and 39 (Figs. 1 and 10) are the weakest, and the female or box members 3 and 33, the strongest, structurally. I take cognizance of this structural property and place the structurally weaker pin member in a less exacting stress position which is compression, and the structurally stronger box member into a more exacting stress position which is elongation. This arrangement I carry out throughout all the various combinations of threaded joints shown.

The stress in a suspended drill stem being proportional to the combined weight of the tube and its connecting collars or sub-connections, and the auxiliary connections being much heavier than their tube, foot for foot of length, and as the cost of auxiliary connections is proportionately greater than the cost of tubing of equivalent length, and further because auxiliary connections involve a greater number of threads than is required when connection is made direct, I have eliminated all sub-connecting collars, their excess weight, excess cost, and unecessary threads. Usually, the auxiliary connections include threads of more than one pitch and diameter. In my new connection threads of only one pitch and diameter are required, thereby lessening the fishing hazard as well as manufacturing and reconditioning costs.

In the past tubes have been made having their pin and box ends exteriorly expanded to form square elevator or grappling tool shoulders and stop shoulders for the pin and box. Such exterior integral shoulders on both ends of the tube consume too much of the tube length, resulting in short, and for their length, too heavy tube units. Because such tubes also used exterior pin and box stop shoulders the pin becomes undersized in comparison to box strength. In addition to that draw-back, such pin thread is in longitudinal stress due to the tightening of the joint by tonging and by the boring torque.

Tubes have also been made to convey a hydraulic flow, wherein one end of the tube was exteriorly expanded into a collar to receive regularly threaded tube ends.

The present invention differs in design from all previous tube forms, as will be evidenced by the reference to the drawings.

Figure 1 shows a tube having an exterior outwardly expanding taper 5 terminating in an expanded cylindrical section 3 previously denoted the box member. The conical section 5 provides an enlargement which affords a grip for a so-called elevator or grappling tool or for rotary slips, and the cylindrical section 3 forms a relatively short guiding surface for the drill stem in the well bore, and its upper shoulder 1 forms a stop shoulder for a resilient cushion ring 16, if used. The exteriorly enlarged and reinforced portion 3 and 5 is formed into a relatively long acutely and coarsely threaded box 4 which communicates with a cylindrical bore 6, terminating in a square shoulder 7. The outer end of the threaded box 4 has a relatively long counterbore 2 which, cooperatively with the resilient packing ring 11, retains lubricant between the threads on the box and pin after the joint has been made up.

In addition to the taper 5 providing a seat for an elevator or for the slips of a hoisting apparatus as later brought out, said taper serves as the means for automatically opening the casing head packing devices when introducing the drill stem into the well under a high rock pressure. If the box 3 were formed with an abrupt nether shoulder such shoulder would act as an obstruction against said sealing devices and would necessitate the attention of an extra operator to open said sealing devices at the same time bringing about the objectionable condition of releasing dangerous volumes of ignitible gas.

It will presently be brought out that one type of the drill stem (Figs. 10 to 13) is substantially flush in its outer contour, but the type in Figures 1 to 4 has an advantage of causing its shoulder 1 to abut the nether side of the foregoing sealing devices and thus, to a degree, prevent the forced expulsion of the drill stem from the well under high rock pressures. Upon mechanically abstracting the drill stem from the well it may become necessary to have an operator present to see to the opening of the sealing devices, but in practice the edge of the shoulder 1 will be appreciably beveled or rounded to facilitate working its way thru the sealing devices without the attention of an operator.

The male end of the tube 9 has a relatively long, acutely tapered and coarsely threaded pin 13. The pin terminates in a flat annular hardened seat or stop shoulder 14. On the thread cone, continuous with said threads, is a recess 12 which receives the resilient packing ring 11, cooperatively with long counterbore 2, to retain lubrication on threads 4 and 13 as already brought out. Both the box and pin ends of the tube are interiorly reinforced as shown at 8 and 10.

The joining of two tube units 9 as shown in Figure 1 is illustrated in Figure 4. An end thrust ring which spaces the tube end 14 from the shoulder 7 of the cylindrical bore 6, consists of two rings 26 and 29. The remote ends 25 and 31 of these rings (Fig. 7) are flat and cut at right angles to their axis. Their inner faces 32 are respectively concave and convex spherical, annular surfaces. The two rings are held together by a sheet iron cup 28. The lower ring 29, is press-fitted in the cup 28 and ring 26 is loosely fitted in the cup 28. The upper edge 27, of the cup 28, is spun or flanged inwardly into a groove 30, in ring 26. The outer lower part of the cup 28, is press-fitted in the bore 6. The spherical seat 32 permits the flat face 25 to align with the tube end 14 regardless of which angle the pin sway may assume in relation to the box threads.

The reason for using the self-aligning spherical seat is as follows: In any threaded joint, straight or tapered, there exist minor voids between the threads permitting a certain amount of play. The drill stem, being a relatively very slender shaft, when rotated in a well bore larger than the outside diameters of the collars, will sway from side to side. Further, well bores are never straight, therefore every revolution of the drill stem tends to cause a leverage by the pin in the threaded box, and eventually expands the mouth of the box until it becomes bell-mouthed. The thinner the box wall 3 has become worn, the easier will the box be expanded by the swaying of the pin in the box. The box being tapered, the bottom end of the box is more rigid and consequently stretches less, and therefore may be assumed to retain its thread size. If the stop shoulder 7 in the box, and the pin end 14, have their flat surfaces in direct contact, the heavy torque will keep these surfaces closely and tightly pressed together. But the outer end of the box, having become larger than the pin, permits the pin to bend at a point about four to five threads from the end of the pin on joints having 4 threads per inch. The continuous bending of the pin at that point, small as it may be, eventually fatigues the pin material so that fracture will result. If the end 14 of the tube has opportunity to sway slightly on its seat 15 in the box, the pin need not bend to and fro, therefore fracture does not occur. The spherical seat will permit such sway and remains liquid tight under all conditions of alignment.

It is possible to provide several types of spherical end thrust means within the scope of my invention, but only the simple ones need be illustrated.

The assemblage in Figure 3 shows an exteriorly threaded ring 24 which is freely seated in the counterbore 17 which terminates in the spherical stop shoulder 15. In Figure 6, an enlarged view of the ring, shows that the crests 23 of the threads have been cut flat. The thread diameter is such that the ring 24 may be screwed tightly through the smaller section 18 of the threads in the box 4, but the ring will never be able, without assistance, to pass out again and fall out. The length of the ring 24 is less than the length of the counterbore 17, therefore the unscrewing of the pin 13 from the box 4 will not withdraw the annular thrust ring 24. Still another simple form of thrust ring is seen in the assemblage in Figure 12. The thrust ring 24ª is shown enlarged in Figure 9 and has a groove 19 to receive a round steel wire snap ring 22, shown enlarged in Figure 5. The cylindrical counterbore 45 (Fig. 12) has a groove 44 which registers with groove 19 when the thrust ring 24ª is inserted into its place. The spherical seat 20 of the thrust ring 24ª will rest on the stop shoulder 15 and the snap ring 22 holds the ring 24ª loosely in place, permitting free self-alignment.

It is possible to form the spherical seat directly on the tube end as at 40 in Figure 10, to fit on the spherical stop shoulder 15 forming the bottom of the counterbore 17, see Figure 2 and Figure 11.

The rings in Figures 6, 7 and 9 serve also as spacers between the end of the tube and the box stop shoulder, providing an easy, cheap and accurate method to size the pin by limiting its entry into the box. It is intended to serve as a gauging element.

At this time it is believed desirable to describe in detail the occurrences upon screwing a pin 13 or 39 (Figs. 1 and 10) into a box 4 or 33. An important factor to be taken into account is to screw the pin and box together in such a way that the elastic limit of the metal is not exceeded. The screwing together of the pin and box places the box under tension by virtue of the outward expansion by the pin, and puts the pin under compression by virtue of the reluctance of the box to expand, both the expansion of the box and the compression of the pin being below the elastic limit of the metal.

These factors obtain upon the occasion of a full thread contact, characteristic of the coarse threading herein adopted, and when the full thread contact is established there will be the foregoing lateral or radial stresses between the box and pin, but in order that these stresses may not be excessive, as already indicated, the function of either the stop shoulder 15 or the thrust ring 24 comes into play to gauge or limit the insertion of the pin. The reason for this limitation is to enable the transmission of what may aptly be described as a useful reverse torque.

This term must be understood, and it is most easily understood by reflecting for a moment upon the happenings in the well bore. The rotary at the top revolves the drill stem, but sometimes there will be a temporary obstruction at the bottom that serves to hold the drilling tool back and incidentally cause a twist in the drill stem, it being remembered that the rotary continues its forward driving function with substantial uniformity. When the obstruction at the bottom is overcome the relaxation of the twist in the drill stem will tend to cause it to spring forwardly in the direction of rotation, in other words momentarily turn ahead of the driving effort of the rotary. This sets up a reverse torque in the drill stem, and the effect of this reverse torque is to unscrew the drill stem at one or more of its couplings.

Now, with every pin and box so gauged that the foregoing reverse torque will be disseminated by a relaxing effort in the pins and boxes it follows that there can be an infinitesimal unscrewing effect in each pin and box without breaking the seal between the ring and the pin end.

It is easy to understand that without the ring to stop the screwing in of each pin, such screwing may easily be carried beyond the elastic limit of the metal so that no useful reverse torque would result. The joint would then become too tight. The reader must not gain the impression that a too tight joint is not desirable. The point is that the instant coupling is designed to enable breaking out of the pin or dissassemblage of the coupling at the surface.

If the pin were screwed in so tight that no relaxation could take place in the bore under the circumstances named then it would be impossible to disassemble the joint when necessary at the surface. To summarize, the pin is screwed into the box sufficiently hard to make an absolute seal either against the stop shoulder 13 or against the thrust ring 24 yet leave enough laxity in the threads to permit breaking out at the surface, said laxity, when not permitting an infinitesimal unscrewing in the well bore, being insufficient to disturb the seal-off between the pin end and its stop shoulder.

Frequent allusion has been made to the acute taper of the pins 13, 39. This term is used to define a considerably more pronounced taper in the pin and box threads than is customarily used in tubing joints for well drilling. The amount of taper adopted herein, is approximately 2 to 3″ per foot as distinguished from 3/8 to 3/4″ per foot in the known types of tubing joints.

The purpose of this pronounced taper, in other words the acute taper, is to enable a substantially instantaneous connection of a pin and box without the likelihood of galling the threads. The pin is insertible almost to the bottom of the box, whereupon a full threaded connection is established by giving the box approximately four to six full turns. When this has been accomplished the box and pin will be under the foregoing degree of expansion and compression below the elastic limits of the metal. A fractional turn beyond this condition will establish the final seal-off between the pin end and its stop shoulder.

The advantage of the acute taper in the pin and box joint also obtains in the unscrewing process. Imagine the tube 9 (Fig. 1) to be suspended by a hook from the top of the derrick preparatory to unscrewing it from a companion tube.

It is readily understood that the various tubes of a suspended stand are under longitudinal tension. When one of the tubes is tonged for unscrewing it from its companion this longitudinal tension will produce an immediate separation after four to six turns in the unscrewing direction. Thus it is conceivable that a stand having its tubes coupled with acutely tapered pins and boxes can have two or three of its tubes unscrewed while only one tube of a stand having threads of the conventional type in its pins and boxes is unscrewed.

The tube so far described, has an integral, exterior expanded box. There are conditions in well boring when it is desirable or necessary to avoid exterior projections beyond the exterior cylindrical surface of the tube. My joint is equally well adapted as a flush joint, for example as in the modified construction as shown in Figures 10 to 13 inclusive.

The Figure 10 shows below box 33 an exterior recess 34 terminating in shoulder 41. This recess and shoulder may be used as an abutment either for an elevator (grappling hook) or slips.

Inasmuch as the exterior of the box 33 is limited to the tube diameter, the threaded 39 is reduced correspondingly but conforms to previously described designs, excepting that above the threaded cone 37 and packing recess 38 I form another conical section 36 of a taper greater than that of the cone 37 which section 36 has a circular recess 35 thereon. Cone 36 and recess 35 receive and retain a resilient guide or cushion ring 42, shown in Figure 11.

The cushion rings 16 and 42 are usually used on the upper section of the drill stem which remains within casing when drilling, and are less frequently used in an open hole.

In the assemblage in Figure 12 is shown the connection of two tubes having an exterior recess 49 on the pin as well as on the box end of the tube as at 34. In general practice, the box end is always uppermost on all tube units forming the assembled drill stem, but on occasion when it becomes necessary to have a pin end pointing upwards on one tube unit, the same elevators and slips must be usable to handle such tube unit, therefore, I provide said recess 49 on the pin end also. It is not necessary to have the pin end recess 49 on every tube, about three or four of such tubes being enough for one string of drill pipe.

The tube shown in Figure 13 is similar to tubes in Figure 12 excepting that the cushion retaining cone 36 (Fig. 10) and the pin end recess 49 are eliminated. These two types of tubes are inter-changeable, one for the other, in the same string.

It is obvious that shoulders 41 and 50 do not form exterior projections beyond the outer surface of the tube, therefore, a drill stem composed of tube shown in Figures 10 or 13 is a flush inserted joint drill stem. It is equally obvious that thread connections, and thrust and end thrust alignment, liquid seal ahead of threads and means to retain a lubricant on the threads are similar in all designs shown in main principles.

It is also obvious that the threaded joint having the exteriorly expanded box 3 and unreduced tube pin 13 (Figs. 1 and 2) is the stronger of the two types of connections, but that both designs have a tube of the same exterior diameter, and may be handled by the same elevators, slips and pipe tongs.

It is recommended to use the flush joint type tubes in the lower end of the string in an open hole, and the expanded joint tube connections in the upper end of the drill stem which remains within the casing. A stem made up in this fashion is the strongest and safest drill stem made.

The choice of use of any type of annular spherical seal and end thrust ring, separate or integral with the tube, and the selective arrangement of details in one tube on another tube herein disclosed, is considered within the scope of this invention, though the principle of ball or spherical joints is old.

The nature of the operating conditions being ever changeable, the use or non-use of the cushion ring 42 is optional with the user.

From the foregoing it is clear that in my new threaded tube connection no exterior abutting surfaces between pin and box joint are used. The ring 42 is flexible, therefore, abutment 43 contributes nothing toward the end thrust on box end.

Lubricant retaining ring 11 is elastic enough to be pressable into recess 12 (Fig. 2) and be retained by its elasticity.

It is noteworthy that the water-course 46 (Figs. 2 and 4) in my joint may be made somewhat larger than the water-course in two-piece tool joints of the same size.

The presence of the conical section 5 also serves as a safeguard to prevent the drill stem from sliding through dull rotary slips and thus becoming lost in the well.

By the use of conical contours 5, indirectly an appreciable saving of material and cost of upsetting is brought about without sacrificing any of the strength in the box.

By the elimination of every exterior shoulder on the pin end of the tube, a stronger and larger diametered pin than the standard pin in two-piece tool joints may be had.

But of by far greater importance are the more favorable stress conditions in threaded portions of connecting members.

A feature of considerable importance in any drill stem is how easily it can be handled on the derrick while the tubes are parted to sections to be stacked side by side and stood on their pin ends in a very limited space. Having eliminated the exterior flange on pin ends the fourbles pin ends standing on derrick floor had a tendency to stack too close to each other, making it difficult to manipulate the hand hook used by derrick men to guide the pin end of each stand in the course of operations. Occasionally, even the pin threads become mutilated by colliding with another tube. To overcome these objections, I provide a semi-circular recess 47 on the end of the tube (Fig. 4) to permanently retain a short, exteriorly cylindrical rubber ring 48 of equal or less diameter than the box 3. Ring 48 serves to space the fourbles standing on tubing boards, prevent the otherwise unprotected threads from colliding with other tubes, and in general facilitates the handling of the tubes on the derrick and when stacked for storage, or in transit. Ring 48 is not to be assumed to be a substitute for or equivalent to guide ring 16, whose purpose is to guide drill stem in a well bore and retard wear on tool joint collars and conductor casing. Ring 48 does not reach outside of box 3 and is also too short for the purpose of the guide 16. Its elastic properties will retain it in groove 47. Tubes shown in Figures 10, 12, and 13 do not require such ring, their threaded pins being reduced. On tubes such as in Figure 11 ring 42 extends beyond box collar and is longer than ring 48. It is used for an entirely different purpose, namely to guide the stem in the well bore, and is of a different design than ring 16.

Having thus described my invention, what I claim is:

1. In a rotary drill stem coupling, an acutely tapered box member, an acutely tapered pin member, said members being threaded for engagement to an extent wherein the box is under tension and the pin under compression, and spherically surfaced cooperatively engaging means associated with said members to form and maintain a fluid seal independently of the threads throughout the endurance of an elastic stress between said members enabling a permissible reverse torque.

2. In a rotary drill stem coupling, an acutely tapered box member, an acutely tapered pin member, said members being threaded for engagement to an extent wherein the box is under tension and the pin under compression, cooperatively engaging means associated with said members to form and maintain a fluid seal throughout the endurance of an elastic stress between said members enabling a permissible reverse torque, said engaging means including spherically struck contacting surfaces enabling rocking of the pin member in respect to the box member and still maintaining said seal after a limited wearing away of the box member and a consequent reduction in its tension.

3. A rotary drill stem comprising a tube having an acutely tapered box member, a companion tube having an acutely tapered pin member, said members being threaded for engagement to an extent wherein the box is under tension and the pin under compression, said pin member being inwardly thickened to provide a substantial end face and said face being spherically surfaced, said box member having a spherically surfaced stop shoulder of an area substantially equal to the adjacent pin end face and adapted for having a cooperative engagement therewith to form an internal fluid seal in advance of the engaging threads of a degree of friction enabling a reverse torque in said engaging threads without breaking the fluid seal at said base and shoulder.

4. A rotary drill stem comprising a tube having an acutely tapered box member, a companion tube having an acutely tapered pin member, said members being threaded for engagement to an extent wherein the box is under tension and the pin under compression, a seat embodied in the pin member having a spherical contacting surface, and a confronting stop shoulder embodied in the box having a complemental spherical contacting surface, said surfaces forming an internal fluid seal in advance of the threads and being capable of relative motion without breaking the seal after a limited reduction of the tension in the box due to wearing away of the box.

5. A rotary drill stem coupling comprising a tube having an acutely tapered box member, a companion tube having an acutely tapered pin member, said members being threaded for engagement to an extent wherein the box is under tension and the pin under compression, a spherically surfaced stop shoulder embodied in the box, said shoulder merging with a counter bore which extends to the inner terminal of the box threads, and a spherically surfaced seat formation on the pin member extending into said counter bore and being adapted to exercise a sealing off pressure on said shoulder.

6. A rotary drill stem coupling comprising a tube having an acutely tapered box member, a companion tube having an acutely tapered pin member, said members being threaded for engagement to an extent wherein the box is under tension and the pin under compression, a stop shoulder embodied in the box, said shoulder merging with a counter bore which extends to the inner terminal of the box threads, a seat formation on the pin member extending into said counter bore and being adapted to exercise a sealing off pressure on said shoulder, and a thrust structure interposed between the seat and shoulder, being engaged by the seat and occupying the counter bore to gauge the screwing in of the pin member so as not to exceed the elastic limit of the metal, said seat, ring and shoulder composing an internal seal-off in advance of the engaging threads of a degree enabling reverse torque in said engaging threads without breaking the seal.

7. A rotary drill stem comprising a tube having an external outward taper from its normal diameter at one end to provide an enlargement, said external taper causing the parting of sealing devices in a casing head construction when lowering the drill stem into a well, said enlargement having a tapering box member, and a companion tube having a tapering pin member, the taper of said member beginning at the normal diameter of said companion tube, said box and pin members being threaded for engagement.

8. In a rotary drill stem, a tube having a tapered box member, said member being threaded and terminating in an internal counter bore, and a thrust ring loosely situated in the counter bore, said ring having threads by which it is screwed into and past the smallest threads of the box member until it drops into the counter bore.

9. In a rotary drill stem, a tube having a tapered box member, said member being threaded and terminating in an internal counter bore, a stop shoulder in the counter bore having a spherical contacting surface, and a thrust ring having a complemental spherical surface on one end and a flat surface on the opposite end, said ring having threads by which it is screwed into and past the smallest threads of the box member until it drops into said counter bore.

10. A rotary drill stem comprising a tube having a tapered box member, said member being threaded and terminating in an internal counter bore, a stop shoulder having a spherical contacting surface merging into the counter bore, a thrust ring having a complemental spherical surface on one end and a flat surface on the opposite end, said ring being threaded for screwing into and past the smallest box member until said ring drops into the counter bore, a companion tube having a tapered and threaded pin member screwed into the box member, and a flat seat at the inner terminal of the tapered pin member engaging the flat surface of the thrust ring.

11. In a rotary drill stem, a tube having a taper-threaded box member, and a ring having external threads by which it is screwed into and past the smallest of the taper-threads, said box having a counter bore receiving the ring of a smaller diameter than the root diameter of said smallest threads and being of a depth greater than the thickness of the ring.

12. In a rotary drill stem comprising a tube having a taper-threaded box member with counter bores at opposite ends; a stop shoulder in the box member merging with one of the counter bores, a companion tube having a taper-threaded pin member screwed into the box member, said pin member having an annular recess confronting the other counter bore in the box member, a seat on the inner terminal of the pin member making a metal to metal contact with the shoulder consequently a seal-off to prevent the seepage of fluid into the thread spaces, and packing means in the confronting annular recess and counter bore preventing the escape of lubricant from the thread spaces.

13. A rotary drill stem comprising a tube having a tapered box member having an internal counter bore, an internal stop shoulder at the base of the counter bore, a companion tube having a tapered pin member, said members being threaded for engagement, a seat at the inner terminal of the pin member, and a thrust ring assemblage between the seat and shoulder, said assemblage comprising a pair of rings having spherical contact surfaces, and means carried by one of the rings, fitting the counter bore and having a flange to hold the other ring in place.

GUSTAVUS A. MONTGOMERY.